United States Patent
Tsai et al.

(10) Patent No.: US 10,318,080 B2
(45) Date of Patent: Jun. 11, 2019

(54) TOUCH PANEL

(71) Applicant: HANNSTOUCH SOLUTION INCORPORATED, Tainan (TW)

(72) Inventors: Ching-Feng Tsai, Tainan (TW); Wei-Ren Lo, Tainan (TW)

(73) Assignee: HANNSTOUCH SOLUTION INCORPORATED, Tainan (TW)

(*) Notice: Subject to any disclaimer, the term of this patent is extended or adjusted under 35 U.S.C. 154(b) by 45 days.

(21) Appl. No.: 15/410,743

(22) Filed: Jan. 19, 2017

(65) Prior Publication Data
US 2018/0203531 A1 Jul. 19, 2018

(51) Int. Cl.
G06F 3/045 (2006.01)
G06F 3/041 (2006.01)
G06F 3/044 (2006.01)

(52) U.S. Cl.
CPC .... G06F 3/044 (2013.01); *G06F 2203/04102* (2013.01); *G06F 2203/04111* (2013.01); *G06F 2203/04112* (2013.01)

(58) Field of Classification Search
CPC ....... G06F 3/044; G06F 3/0412; G06F 3/0416
See application file for complete search history.

(56) References Cited

U.S. PATENT DOCUMENTS

| | | | |
|---|---|---|---|
| 2014/0267947 A1* | 9/2014 | Yeh | G06F 3/03547 349/12 |
| 2016/0041644 A1* | 2/2016 | Bae | G06F 3/044 345/174 |
| 2018/0122864 A1* | 5/2018 | Lee | G06F 3/0412 |

* cited by examiner

*Primary Examiner* — Nan-Ying Yang
(74) *Attorney, Agent, or Firm* — CKC & Partners Co., LLC (57) ABSTRACT

A touch panel includes a substrate, a touch electrode, a control unit, and a trace structure. The substrate has a touch sensing area and a peripheral circuit area. The touch electrode is disposed on the touch sensing area of the substrate. The touch electrode includes a first transparent conductive layer, a second transparent conductive layer, and a metal mesh layer. The second transparent conductive layer is disposed on the first transparent conductive layer. The metal mesh layer is disposed between the first transparent conductive layer and the second transparent conductive layer, in which the metal mesh layer is at least partially in contact with the first transparent conductive layer and the second transparent conductive layer, and the metal mesh layer comprises plural metal lines. The trace structure is disposed on the peripheral circuit area of the substrate and configured to electrically connect the touch electrode to the control unit.

11 Claims, 9 Drawing Sheets

TOUCH PANEL

BACKGROUND

Field of Invention

The present invention relates to a touch panel.

Description of Related Art

In recent years, the capacitive touch screen has been widely applied in the field of electronic products. The capacitive touch screen operates by detecting the electric current induced by the human body, and is a kind of touch screen that senses touch signals through the combined properties of electrodes and the human body. When a touch screen is touched (by a finger), since the electric field is affected by the human body, a coupling capacitance is formed between the finger and the conductive layer of the touch screen, the current generated by the electrodes of the touch screen would flow to the point of touch, and therefore the point of touch may be calculated accurately.

In general, the touch panel is a critical part of the touch screen, in which the touch panel mainly includes two portions, which are a conductive layer and an insulating substrate. In pursuit of high brightness, the conductive layer is mainly formed with transparent conductive materials, which are formed on the insulating substrate by techniques, such as vacuum coating or pattern by etching. However, the transparent conductive materials are formed with oxide metals, which may suffer from high electric resistance.

SUMMARY

In the embodiments of present invention, in order to increase the transmittance and conductance of sensing electrodes of the touch panel, the sensing electrodes are formed with the transparent conductive material, the mesh metal conductive material, and the transparent conductive material. In some embodiments, traces and connection lines may also be designed to have the three-layer structure. In some embodiments, the transparent conductive materials may also be designed to have a mesh structure, and the mesh pattern may be the same as the pattern of the mesh metal conductive material, thereby saving the number of the masks used in fabrication processes.

According to some embodiments of the present invention, a touch panel includes a substrate, a touch electrode, a control unit, and a trace structure. The substrate has a touch sensing area and a peripheral circuit area. The touch electrode is disposed on the touch sensing area of the substrate. The touch electrode includes a first transparent conductive layer, a second transparent conductive layer, and a metal mesh layer. The second transparent conductive layer is disposed on the first transparent conductive layer. The metal mesh layer is disposed between the first transparent conductive layer and the second transparent conductive layer, in which the metal mesh layer is at least partially in contact with the first transparent conductive layer and the second transparent conductive layer, and the metal mesh layer includes plural metal lines. The trace structure is disposed on the peripheral circuit area of the substrate and configured to electrically connect the touch electrode to the control unit.

In the embodiments of the present invention, the metal lines of the metal mesh layer form at least one metal line opening, and the second transparent conductive layer has at least one second opening corresponding to the metal line opening.

In the embodiments of the present invention, the first transparent conductive layer has at least one first opening corresponding to the metal line opening.

In the embodiments of the present invention, the first transparent conductive is a solid layer.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
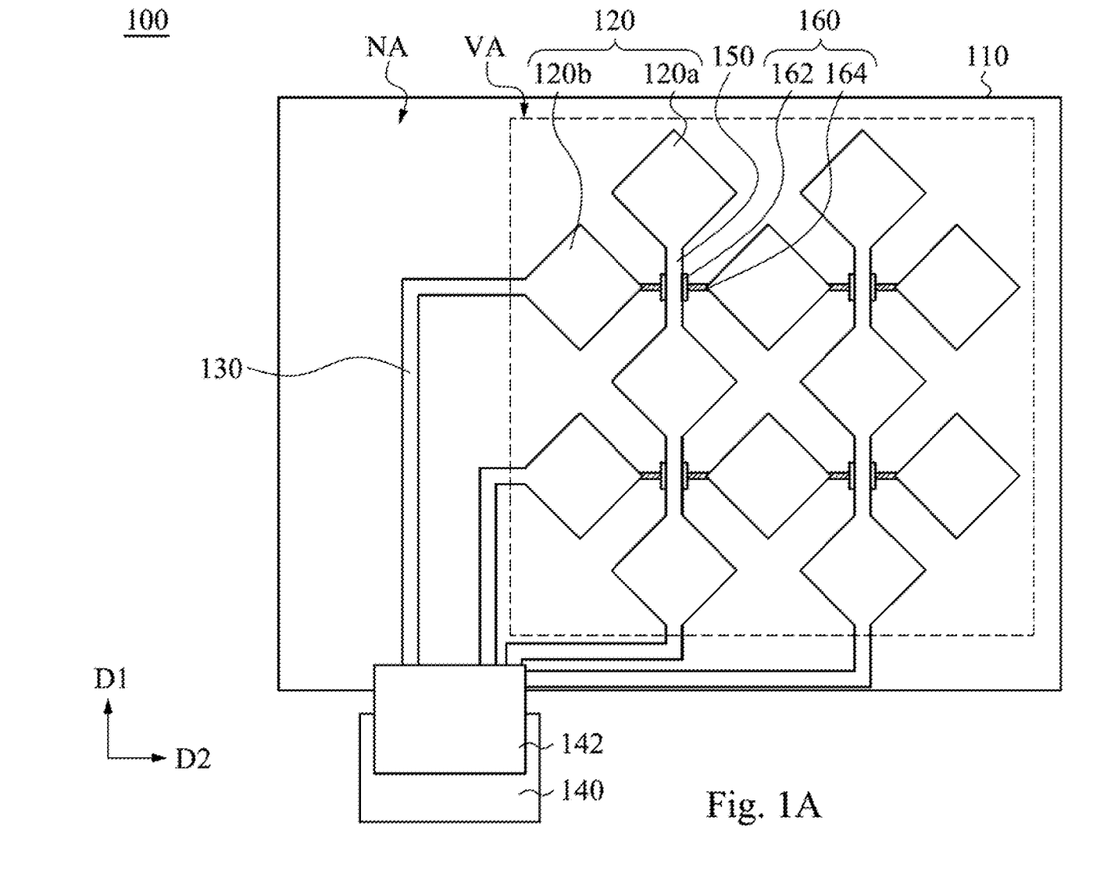
FIG. 1A is a top schematic view of a touch panel according to some embodiments of the invention.

FIG. 1A is a top schematic view of a touch panel 100 according to some embodiments of the invention. The touch panel 100 includes a substrate 110, at least one touch electrode 120, at least one trace structure 130, and a control unit 140. The touch electrodes 120 are disposed on the substrate 110. The trace structures 130 are disposed on the substrate 110 and configured to electrically connect the touch electrodes 120 to the control unit 140. Herein, the control unit 140 and the trace structures 130 may be electrically connected by a flexible printed circuit board 142, but it should not limit the scope of the present invention. In other embodiments, the control unit 140 may be directly disposed on the substrate 110 and electrically connected with the trace structures 130.

Herein, the touch panel 100 is configured with two-layer touch electrodes. To be specific, in some embodiments of the present invention, the touch electrodes 120 include touch electrodes 120a and touch electrodes 120b, respectively arranged along a first direction D1 and a second direction D2. The touch panel 100 further includes at least one connection structure 150 and at least one bridge structure 160. One of the connection structures 150 connects adjacent two of the touch electrodes 120a. One of the bridge structures 160 connects two of the touch electrodes 120b respectively disposed at two sides of the one of the connection structures 150. Each of the bridge structures 160 includes an insulation island 162 and a bridge conductive line 164. In some embodiments of the present invention, each of the bridge conductive lines 164 connects two touch electrodes 120b, and the insulation islands 162 are respectively disposed between the bridge conductive lines 164 and the connection structures 150, such that each of the connection structures 150 may connect two touch electrodes 120a without being electrically connected with the bridge conductive lines 164. Through the configuration, the connection structures 150 and the touch electrodes 120a form an electrode series extending along the first direction D1, and the bridge structures 160 and the touch electrodes 120b form an electrode series extending along the second direction D2, in which the first direction D1 is not parallel with the second direction D2, and the two series of electrodes intersect. For example, the first direction D1 and orthogonal to the second direction D2.

In some embodiments, the touch panel 100 may include a touch sensing area VA and a peripheral area NA, in which the touch electrodes 120, the connection structures 150, and the bridge structures 160 are disposed in the touch sensing area VA of the touch panel, and the trace structures 130 extend from the peripheral area NA to the touch sensing area VA so as to electrically connect the touch electrodes 120. In some embodiments, the touch panel 100 may include a shielding layer (e.g., black matrix, not shown) for blocking light from the peripheral area NA and the shielding layer may have an opening for transmitting light from the touch sensing area VA. In some embodiments, the trace structures 130 may be disposed on and in contact with a surface of the shielding layer opposite the substrate 110. In some embodiments, the shielding layer may be made of an opaque material, such as black inks and white inks.

Figure 1B:
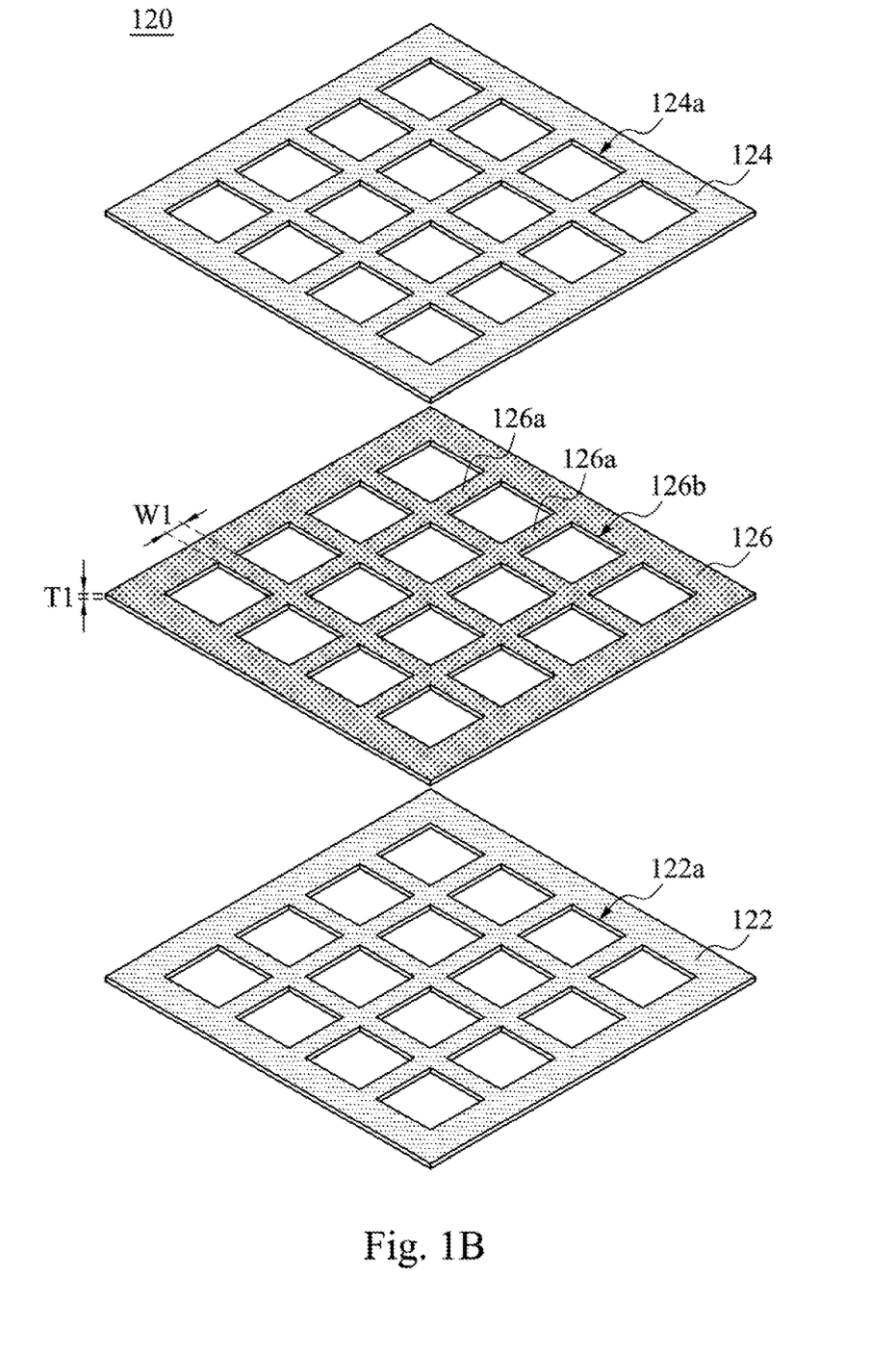
FIG. 1B is an exploded schematic view of one of touch electrodes of the touch panel of FIG. 1A.

Reference is made to both FIG. 1A and FIG. 1B. FIG. 1B is an exploded schematic view of one of the touch electrodes 120 of the touch panel 100 of FIG. 1A. The one of the touch electrodes 120 (which may be the touch electrodes 120a or the touch electrodes 120b) include a first transparent conductive layer 122, a second transparent conductive layer 124, and a metal mesh layer 126. The first transparent conductive layer 122 is disposed on the substrate 110. The second transparent conductive layer 124 is disposed on the first transparent conductive layer 122. The metal mesh layer 126 is disposed between the first transparent conductive layer 122 and the second transparent conductive layer 124, in which the metal mesh layer 126 is at least partially in contact with the first transparent conductive layer 122 and the second transparent conductive layer 124, and the metal mesh layer 126 includes plural metal lines 126a. The metal lines 126a of the metal mesh layer 126 form at least one metal line opening 126b. The first transparent conductive layer 122 has at least one first opening 122a corresponding to the metal line openings 126b, and the second transparent conductive layer 124 has at least one second openings 124a corresponding to the metal line openings 126b.

In some embodiments of the present invention, the real portion of the metal mesh layer 126 (excluding the metal line openings 126b) is sandwiched between the real portion of the first transparent conductive layer 122 (excluding the first openings 122a) and the real portion of the second transparent conductive layer 124 (excluding the second openings 124a). Through the configuration, a multilayer configuration is formed, so that the touch electrodes 120 have high transmittance and high conductance.

In some preferred embodiments, the real portion of the metal mesh layer 126 (excluding the metal line openings 126b) is fully sandwiched between the real portion of the first transparent conductive layer 122 (excluding the first openings 122a) and the real portion of the second transparent conductive layer 124 (excluding the second openings 124a). To be specific, a vertical projection of the real portion of the metal mesh layer 126 on the substrate 110 is fully inside a vertical projection of the real portion of the first transparent conductive layer 122 on the substrate 110, and the vertical projection of the real portion of the metal mesh layer 126 on the substrate 110 is fully inside a vertical projection of the real portion of the second transparent conductive layer 124 on the substrate 110. Through the configuration, a portion of the one of the touch electrodes 120 having the metal mesh layer 126 is configured with the multilayer structure. For example, top and bottom surfaces of the real portion of the metal mesh layer 126 (excluding the metal line openings 126b) are respectively and directly in contact with the first transparent conductive layer 122 and the second transparent conductive layer 124 completely.

In some embodiments, for enhancing the transmittance of the metal mesh layer 126, the metal mesh layer 126 is designed to be thin. For example, a thickness T1 of the metal mesh layer 126 is in a range of about 50 angstroms to about 500 angstroms, preferably 50 angstroms to 300 angstroms. In some embodiments, for maintaining the conductance of the metal mesh layer 126, a width W1 of the metal lines 126a of the metal mesh layer 126 is in a range of about 3 micrometers to 20 micrometers, preferably 3 micrometers to 10 micrometers or 5 micrometers to 10 micrometers.

Figure 1C:
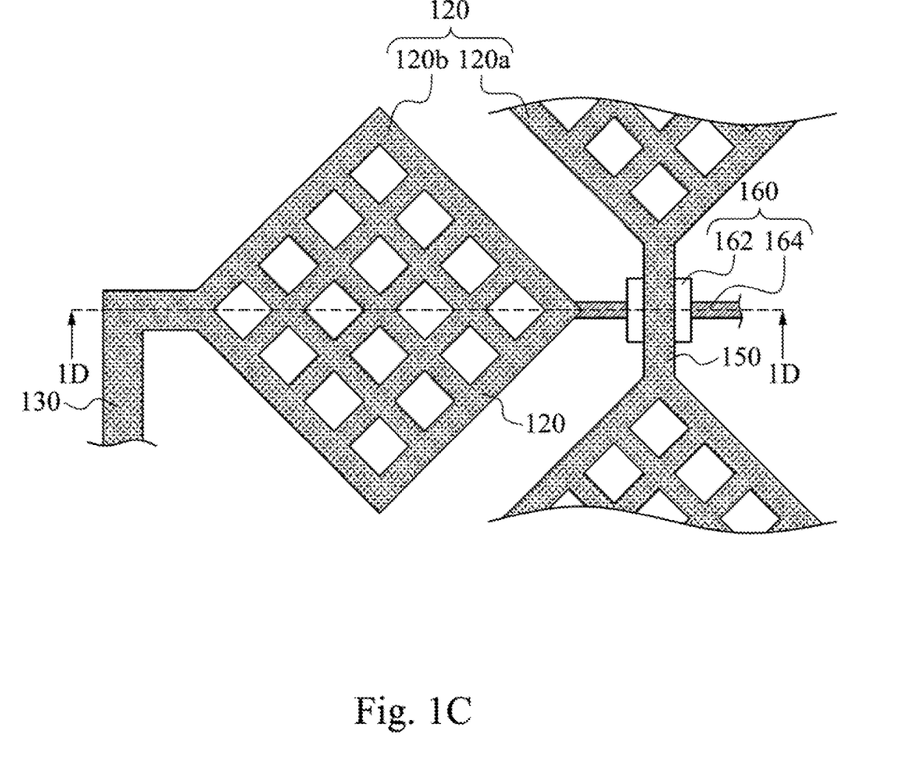
FIG. 1C is an enlarged top schematic view of a portion of the touch panel of FIG. 1A.
Figure 1D:
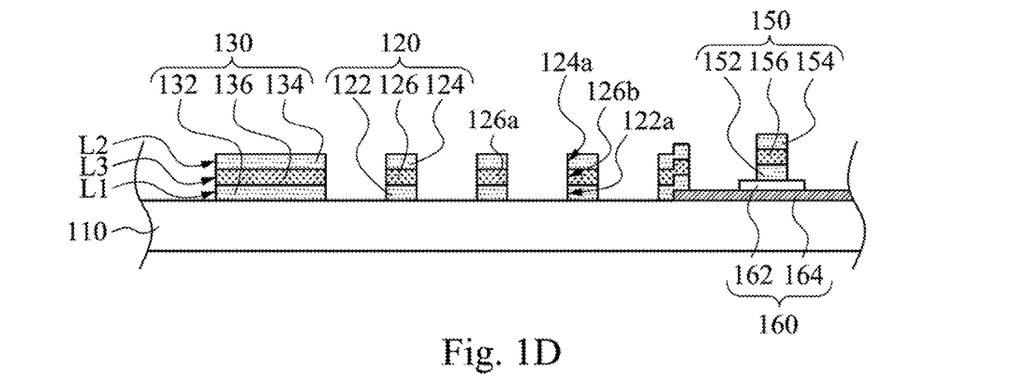
FIG. 1D is a cross-sectional schematic view taken along a line 1D-1D of FIG. 1C.

FIG. 1C is an enlarged top schematic view of a portion of the touch panel 100 of FIG. 1A. FIG. 1D is a cross-sectional schematic view taken along a line 1D-1D of FIG. 1C. Reference is made to both FIG. 1C and FIG. 1D. In some embodiments of the present invention, the trace structure 130 may be configured with the multilayer structure. In some embodiments, the trace structure 130 includes at least one first transparent trace 132, at least one second transparent trace 134, and at least one metal trace 136. The first transparent trace 132 is disposed between the metal trace 136 and the substrate 110. The metal trace 136 is disposed between the second transparent trace 134 and the substrate 110. Herein, the first transparent trace 132, the second transparent trace 134, and the metal trace 136 are solid structures. In other embodiments, at least one of the transparent trace 132, the second transparent trace 134, and the metal trace 136 of the trace structure 130 may be a mesh structure, which has openings therein as the touch electrodes 120 do. Furthermore, the openings of the transparent trace 132, the openings of the second transparent trace 134, and the openings of the metal trace 136 may be overlapped with and corresponding to each other.

In some embodiments, the touch electrodes 120 and the trace structure 130 may be fabricated in the same process. To be specific, the metal trace 136 and the metal mesh layer 126 may be formed with the same metal layer L3 being patterned, and the thickness and materials of the metal trace 136 and the metal mesh layer 126 are substantially the same. Similarly, the first transparent trace 132 and the first transparent conductive layer 122 may be formed with the same transparent conductive material layer L1 being patterned, and the thickness and materials of the first transparent trace 132 and the first transparent conductive layer 122 are substantially the same. Similarly, the second transparent trace 134 and the second transparent conductive layer 124 may be formed with the same transparent conductive material layer L2 being patterned, and the thickness and materials of the second transparent trace 134 and the second transparent conductive layer 124 are substantially the same.

Herein, for clear illustration, the transparent conductive material layer L1 is referred to as the layer that the first transparent conductive layer 122, the first transparent trace 132, a first transparent connection line 152 lie in. The transparent conductive material layer L2 is referred to as the layer that the second transparent conductive layer 124, the second transparent trace 134, a second transparent connection line 154 lie in. The metal layer L3 is referred to as the layer that the metal mesh layer 126, the metal trace 136, a metal connection line 156 lie in. The transparent conductive material layer L1 and the transparent conductive material layer L2 may be formed with transparent materials, such as indium tin oxide (ITO) or indium zinc oxide (IZO). The metal layer L3 may be formed with various metals having good conductivity, such as copper (Cu), silver (Ag), Aluminum (Al), Molybdenum (Mo), or Titanium (Ti).

It is noted that, the trace structure 130 may not be configured with a multilayer structure. For example, the trace structure 130 may only include the metal trace 136, but not include the first transparent trace 132 and the second transparent trace 134. Alternatively, the trace structure 130 may include only the first transparent trace 132, the second transparent trace 134, or the combination thereof, but not include the metal trace 136. Of course, it should not limit the scope of the present invention. In other embodiments, the trace structure 130 and the bridge conductive line 164 may be formed together on the substrate 110, which will be illustrated in the embodiments of FIG. 9.

In the plural embodiments of the present invention, the connection structure 150 may be configured with a multilayer structure. The connection structure 150 includes the first transparent connection line 152, the second transparent connection line 154, and the metal connection line 156. Herein, the first transparent connection line 152, the second transparent connection line 154, and the metal connection line 156 are solid structures. In other embodiments, at least one of the first transparent connection line 152, the second transparent connection line 154, and the metal connection line 156 of the connection structure 150 may be a mesh structure, which has openings therein as the touch electrodes 120 do. Furthermore, the openings of the first transparent connection line 152, the openings of the second transparent connection line 154, and the openings of the metal connection line 156 may be overlapped with and corresponding to each other.

In some embodiments, the touch electrodes 120 and the connection structure 150 may be fabricated in the same process. To be specific, the first transparent connection line 152 and the first transparent conductive layer 122 may be formed with the same transparent conductive material layer L1 being patterned, and the thickness and materials of the first transparent connection line 152 and the first transparent conductive layer 122 are substantially the same. The second transparent connection line 154 and the second transparent conductive layer 124 may be formed with the same transparent conductive material layer L2 being patterned, and the thickness and materials of the second transparent connection line 154 and the second transparent conductive layer 124 are substantially the same. The metal connection line 156 and the metal mesh layer 126 may be formed with the same metal layer L3 being patterned, and the thickness and materials of the metal connection line 156 and the metal mesh layer 126 are substantially the same.

It is noted that, the connection structure 150 may not be configured with the multilayer structure. For example, the connection structure 150 may only include the metal connection line 156, but not include the first transparent connection line 152 and second transparent connection line 154. Alternatively, the connection structure 150 may include only the first transparent connection line 152, the second transparent connection line 154, or the combination thereof, but not include the metal connection line 156.

Reference is made to both FIG. 1B and FIG. 1D. In some embodiments of the present invention, the patterned transparent conductive material layer L1, the patterned metal layer L3, and the patterned transparent conductive material layer L2 may be formed by exposure processes utilizing the same mask. In some embodiments of the present invention, because of the utilization of the same mask, the first transparent conductive layer 122, the metal mesh layer 126, and the second transparent conductive layer 124 has substantially the same pattern. To be specific, the first openings 122a of the first transparent conductive layer 122, the metal line openings 126b of the metal mesh layer 126, and the second openings 124a of the second transparent conductive layer 124 have vertical projections of substantially the same shape on the substrate 110, and ideally, the vertical projections are overlapped with each other. That is, the areas of the first openings 122a, the metal line openings 126b, and the second openings 124a are ideally equal to each other.

Of course, because of the limitation of accuracy on fabrication processes, in actual configuration, the first openings 122a of the first transparent conductive layer 122, the metal line openings 126b of the metal mesh layer 126, and the second openings 124a of the second transparent conductive layer 124 may have slight misalignment with each other. As a consequence, the real portion of the metal mesh layer 126 (excluding the metal line openings 126b) may not be fully sandwiched between the real portion of the first transparent conductive layer 122 (excluding the first openings 122a) and the real portion of the second transparent conductive layer 124 (excluding the second openings 124a).

Similarly, because of the utilization of the same mask, the first transparent trace 132, the second transparent trace 134, and the metal trace 136 have substantially the same pattern. To be specific, the first transparent trace 132, the second transparent trace 134, and the metal trace 136 have vertical projections of substantially the same shape on the substrate 110, and the vertical projections are overlapped with each other. That is, the widths of the first transparent trace 132, the second transparent trace 134, and the metal trace 136 are substantially the same.

Similarly, because of the utilization of the same mask, the first transparent connection line 152, the second transparent connection line 154, and the metal connection line 156 have substantially the same pattern. To be specific, the first transparent connection line 152, the second transparent connection line 154, and the metal connection line 156 have vertical projections of substantially the same shape on the substrate 110, and the vertical projections are overlapped with each other. That is, the widths of the first transparent connection line 152, the second transparent connection line 154, and the metal connection line 156 are substantially the same.

It is noted that, in some embodiments, the patterned transparent conductive material layer L1, the patterned metal layer L3, and the patterned transparent conductive material layer L2 may be formed by exposure processes utilizing the different masks. Alternatively, in some embodiments, only the patterned transparent conductive material layer L1 and the patterned metal layer L3 are formed by exposure processes utilizing the same mask, but the transparent conductive material layer L2 is formed by the exposure processes utilizing a different mask.

In some embodiments of the present invention, the first transparent connection line 152 is connected with the first transparent conductive layer 122, the second transparent connection line 154 is connected with the second transparent conductive layer 124, and the metal connection line 156 is connected with the metal mesh layer 126. In actual applications, when the patterned transparent conductive material layer L1, the patterned metal layer L3, and the patterned transparent conductive material layer L2 are formed by exposure processes utilizing the different masks, it may be designed that only one of the first transparent connection line 152, the second transparent connection line 154, and the metal connection line 156 is connected with one of the first transparent conductive layer 122, the second transparent conductive layer 124, the metal mesh layer 126, thereby realizing the purpose of electrical connection.

In some embodiments of the present invention, the insulation island 162 is disposed on the bridge conductive line 164. The insulation island 162 covers only portions of the bridge conductive line 164 and exposes other portions of the bridge conductive line 164. The touch electrodes 120 may be directly formed on the other portions of the bridge conductive line 164 and therefore directly electrically connected with the bridge conductive line 164. In some embodiments, the insulation island 162 may be formed by suitable dielectric materials, such as silicon dioxide. In some embodiments, the bridge conductive line 164 may be formed by suitable conductive materials, such as copper (Cu), silver (Ag), Aluminum (Al), Molybdenum (Mo) or Titanium (Ti).

In the present embodiments, the patterned transparent conductive material layer L1, the patterned metal layer L3, and the patterned transparent conductive material layer L2 are formed by utilizing the same mask. In the embodiments in the following illustration, the patterned transparent conductive material layer L1, the patterned metal layer L3, and the patterned transparent conductive material layer L2 are sequentially formed through the same or different masks, and the touch panel 100 in the various embodiment shows different structures correspondingly.

Figure 2:
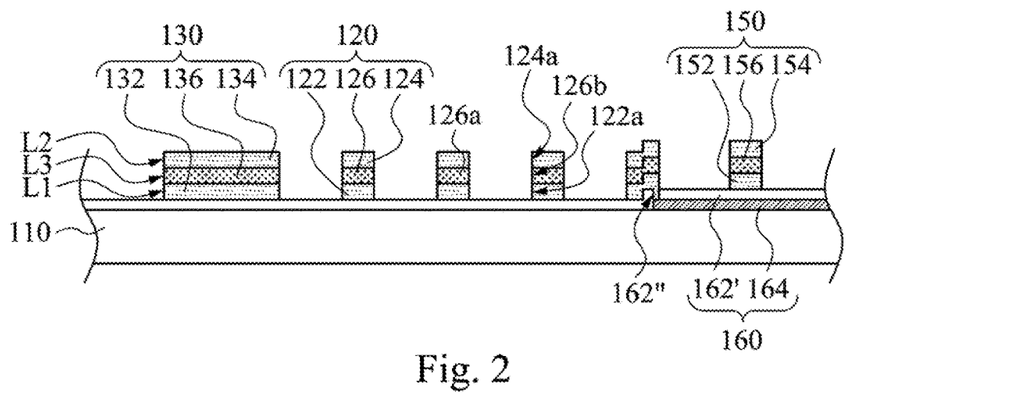
FIG. 2 is a cross-sectional schematic view of a portion of the touch panel according to some embodiments of the invention.

FIG. 2 is a cross-sectional schematic view of a portion of the touch panel 100 according to some embodiments of the invention. The present embodiments are similar to the embodiments of FIG. 1B, and the difference between the present embodiments and the embodiments of FIG. 1B is that: in the present embodiments, the bridge structure 160 includes an insulation layer 162' and the bridge conductive line 164. The insulation layer 162' fully covers the bridge conductive line 164 and the touch sensing area (as shown in FIG. 1A), and the insulation layer 162' has the through holes 162", such that the transparent conductive material layer (e.g., the transparent conductive material layer L1, to be specific, the first transparent conductive layer 122) formed later may fill the through holes 162", and the first transparent conductive layer 122 may be electrically connected with the bridge conductive line 164.

Other details of the present embodiments are similar to that of FIG. 1B, and not repeated therein.

Figure 3:
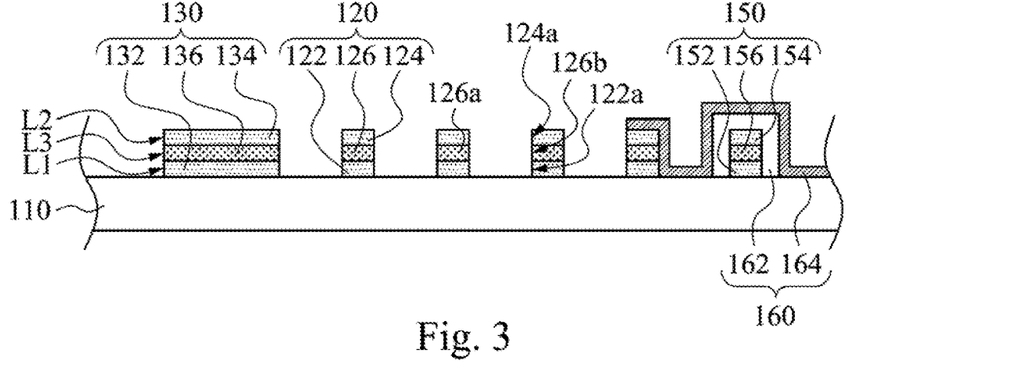
FIG. 3 is a cross-sectional schematic view of a portion of the touch panel according to some embodiments of the invention.

FIG. 3 is a cross-sectional schematic view of a portion of the touch panel 100 according to some embodiments of the invention. The present embodiments are similar to the embodiments of FIG. 1B, and the difference between the present embodiments and the embodiments of FIG. 1B is that: in the present embodiments, the insulation island 162 covers at least a portion of the connection structure 150, and the bridge conductive line 164 of the bridge structure 160 is located on the insulation island 162. As shown in the figure, the bridge conductive line 164 may be directly formed on the touch electrodes 120 and therefore directly electrically connected with the touch electrodes 120.

Other details of the present embodiments are substantially the same as that of FIG. 1B and thereto not repeated herein.

Figure 4:
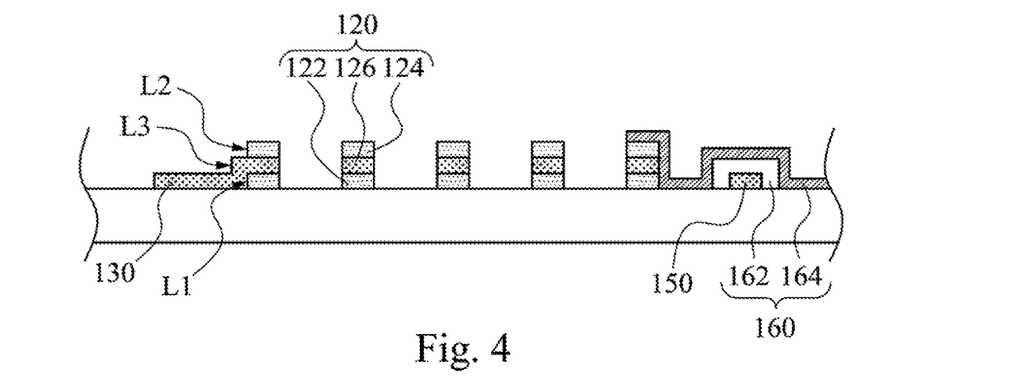
FIG. 4 is a cross-sectional schematic view of a portion of the touch panel according to some embodiments of the invention.

FIG. 4 is a cross-sectional schematic view of a portion of the touch panel 100 according to some embodiments of the invention. The present embodiments are similar to the embodiments of FIG. 1B, and the difference between the present embodiments and the embodiments of FIG. 1B is that: in the present embodiments, the trace structure 130 or/and the connection structure 150 are not configured with the multilayer structures, but are formed with only the metal layer L3, while the touch electrodes 120 are configured with the multilayer structures. That is, the trace structure 130 may only include the metal trace 136 (referring to FIG. 1D), and the connection structure 150 may only include the metal connection line 156 (referring to FIG. 1D). Herein, the design concepts of the present embodiments are illustrated through the configuration shown in FIG. 3, in which the bridge structure 160 is above the connection structure 150. It is noted that, the design concepts of the present embodiments are applicable to the configurations shown in FIG. 1D and FIG. 2, and the trace structure 130 or/and the connection structure 150 in the figures may not be configured with the multilayer structure.

Since the trace structure 130 is mainly located at the non-display area of the substrate 110, the trace structure 130 has little influence on visual effect, and therefore the trace structure 130 may not be configured with the multilayer structure. In some embodiments, the trace structure 130 may only include the metal trace 136 (referring to FIG. 1D). Though it is not shown, the metal trace of the trace structure 130 may have a width substantially equal to that of the metal lines of the metal mesh layer 126 of the touch electrodes 120. In some embodiments, the metal trace of the trace structure 130 may have a width greater than that of the metal lines of the metal mesh layer 126 of the touch electrodes 120, and thereby reducing the electrical resistance of the single-layer trace structure 130 that having only the metal trace. In other embodiments, the trace structure 130 may only include the first transparent trace 132 or the second transparent trace 134 (referring to FIG. 1D), and the first transparent trace 132 or the second transparent trace 134 (referring to FIG. 1D) may have a width greater than that of mesh lines (i.e., transparent conductive lines) of the first transparent conductive layer 122 or the second transparent conductive layer 124, thereby reducing the electrical resistance of the single-layer first transparent trace 132 or the single-layer second transparent trace 134 (referring to FIG. 1D).

On the other hand, the connection structure 150 may be different from the configurations shown the embodiments of FIG. 1B. In some embodiments, since the bridge conductive line 164 is mostly formed with opaque conductive materials, such as metal, the connection structure 150 has little influence on visual effect, so that the connection structure 150 may not be configured with the multilayer structure. Furthermore, the connection structure 150 may only include the metal connection line 156 (referring to FIG. 1D). In some embodiments of the present invention, the metal connection line of the connection structure 150 may have a width greater than that of the metal lines of the metal mesh layer 126 of the touch electrodes 120, and thereby reducing the electrical resistance of the single-layer connection structure 150 that having only the metal connection line. In other embodiments, the connection structure 150 may only include the first transparent connection line 152 or the second transparent connection line 154 (referring to FIG. 1D), and the first transparent connection line 152 or the second transparent connection line 154 (referring to FIG. 1D) have a width greater than that of the mesh lines (i.e., transparent conductive lines) of the first transparent conductive layer 122 or the second transparent conductive layer 124, thereby reducing the electrical resistance of the single-layer first transparent connection line 152 or the single-layer second transparent connection line 154 (referring to FIG. 1D).

In the present embodiments, the patterned transparent conductive material layer L1, the patterned metal layer L3, and the patterned transparent conductive material layer L2 may be formed by exposure processes utilizing the two masks. Other details of the present embodiments are substantially the same as that of FIG. 1B, and thereto omitted herein.

Figure 5:
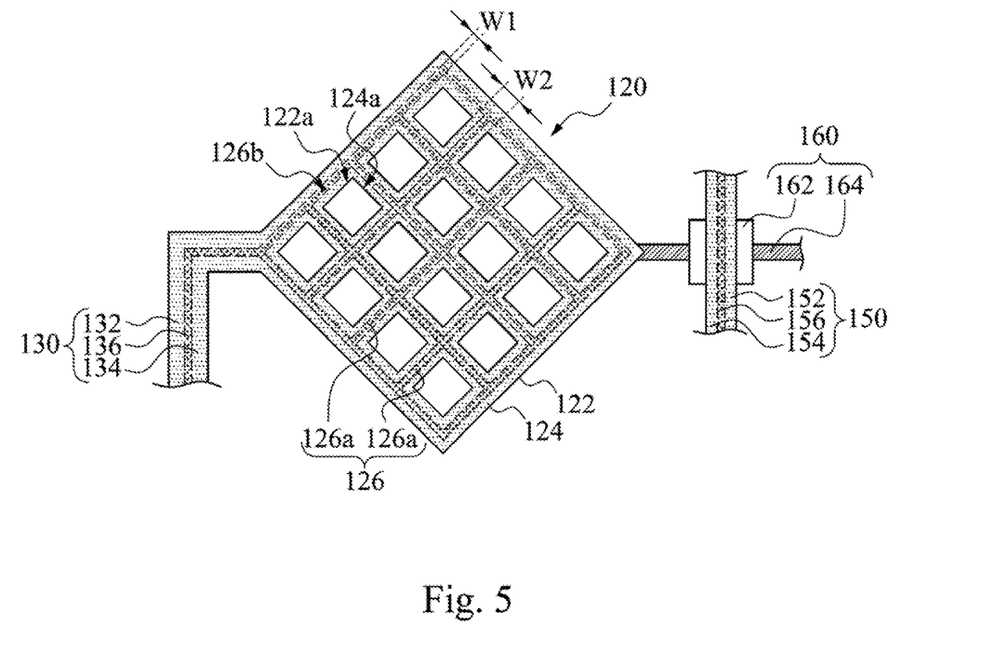
FIG. 5 is an enlarged top schematic view of a portion of the touch panel according to some embodiments of the invention.

FIG. 5 is an enlarged top schematic view of a portion of the touch panel 100 according to some embodiments of the invention. The present embodiments are similar to the embodiments of FIG. 1B, and the difference between the present embodiments and the embodiments of FIG. 1B is that: in the present embodiments, the metal lines 126a of the metal mesh layer 126 has a width W1 smaller than a width W2 of the transparent conductive lines of the first transparent conductive layer 122 or the second transparent conductive layer 124. For example, herein, the width W1 of the metal lines 126a is in a range of 2 micrometers to 5 micrometers, and the width W2 of the transparent conductive lines of the first transparent conductive layer 122 is in a range of 5 micrometers to 10 micrometers. In other words, the metal line openings 126b of the metal mesh layer 126 have an area greater than that of the first openings 122a of the first transparent conductive layer 122 or the second openings 124a of the second transparent conductive layer 124.

In addition, the metal trace 136 of the trace structure 130 may be designed to have a width smaller than a width of the first transparent trace 132 or the second transparent trace 134 of the trace structure 130. The metal connection line 156 of the connection structure 150 may be designed to have a width smaller than a width of the first transparent connection line 152 or the second transparent connection line 154 of the connection structure 150.

Through the configuration, when a process shift happens, it is easy to keep the real portion of the metal mesh layer 126 being fully sandwiched between the real portion of the first transparent conductive layer 122 and the real portion of the second transparent conductive layer 124, it is easy to keep the metal trace 136 being fully sandwiched between the first transparent trace 132 and the second transparent trace 134, and it is easy to keep the metal connection line 156 being fully sandwiched between first transparent connection line 152 and the second transparent connection line 154. Through the configuration, also, the transmittance of the touch panel can also be enhanced.

In the present embodiments, the patterned transparent conductive material layer L1, the patterned metal layer L3, and the patterned transparent conductive material layer L2 may be formed by exposure processes utilizing the two masks. Other details of the present embodiments are substantially the same as that of FIG. 1B, and thereto omitted herein.

Figure 6:
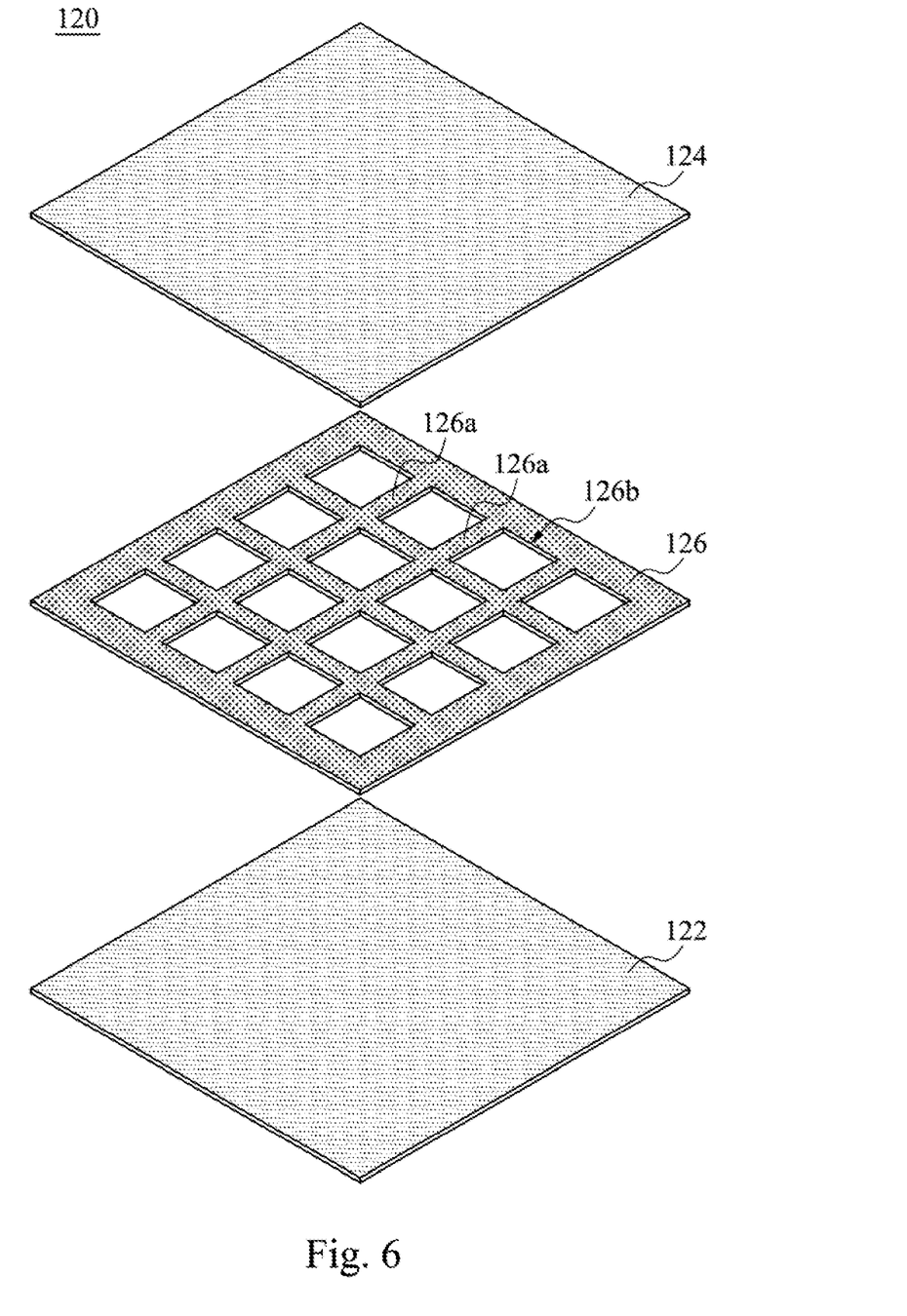
FIG. 6 is an exploded schematic view of touch electrodes of the touch panel according to some embodiments of the invention.

FIG. 6 is an exploded schematic view of touch electrodes 120 of the touch panel 100 according to some embodiments of the invention. The present embodiments are similar to the embodiments of FIG. 1B, and the difference between the present embodiments and the embodiments of FIG. 1B is that: in the present embodiments, the first transparent conductive layer 122 and the second transparent conductive layer 124 are solid structures, without openings therein. Through the configuration, in the touch electrode 120, some portions only include the first transparent conductive layer 122 and the second transparent conductive layer 124, while other portions includes a multilayer configuration. Since the first transparent conductive layer 122 and the second transparent conductive layer 124 have high transmittance the conductance of the touch electrode 120 may be increased without degrading the visual effects.

In the present embodiments, the first transparent conductive layer 122 and the second transparent conductive layer 124 may be exposed through the same mask, and therefore, in actual applications, the touch electrodes 120 may be formed through only two masks. Other details of the present embodiments are substantially the same as that of FIG. 1B, and thereto omitted herein.

Figure 7:
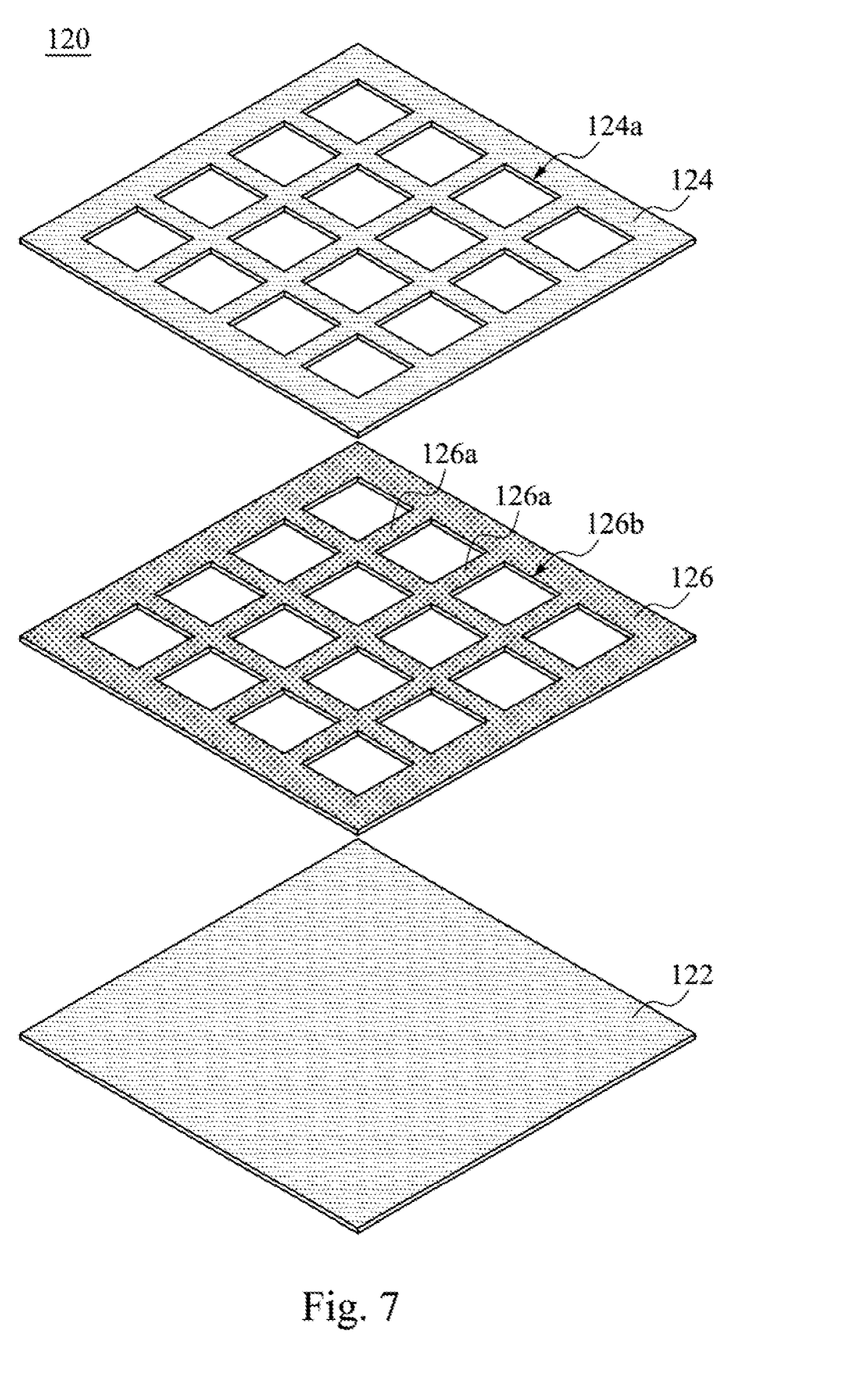
FIG. 7 is an exploded schematic view of touch electrodes of the touch panel according to some embodiments of the invention.

FIG. 7 is an exploded schematic view of touch electrodes 120 of the touch panel 100 according to some embodiments of the invention. The present embodiments are similar to the embodiments of FIG. 1B, and the difference between the present embodiments and the embodiments of FIG. 1B is that: in the present embodiments, the first transparent conductive layer 122 is a solid structure without openings therein, while the second transparent conductive layer 124 is a mesh structure. Through the configuration, in the touch electrode 120, some portions only include the first transparent conductive layer 122, while other portions show the multilayer configuration. Since the first transparent conductive layer 122 has high transmittance, the conductance of the touch electrode 120 may be increased without degrading the visual effects.

In the present embodiments, the metal mesh layer 126 and the second transparent conductive layer 124 may be exposed through the same mask, and therefore, in actual applications, the touch electrode 120 may be formed through only two masks, while the metal mesh layer 126 and the second transparent conductive layer 124 have the same pattern. Other details of the present embodiments are substantially the same as that of FIG. 1B, and thereto omitted herein.

Figure 8:
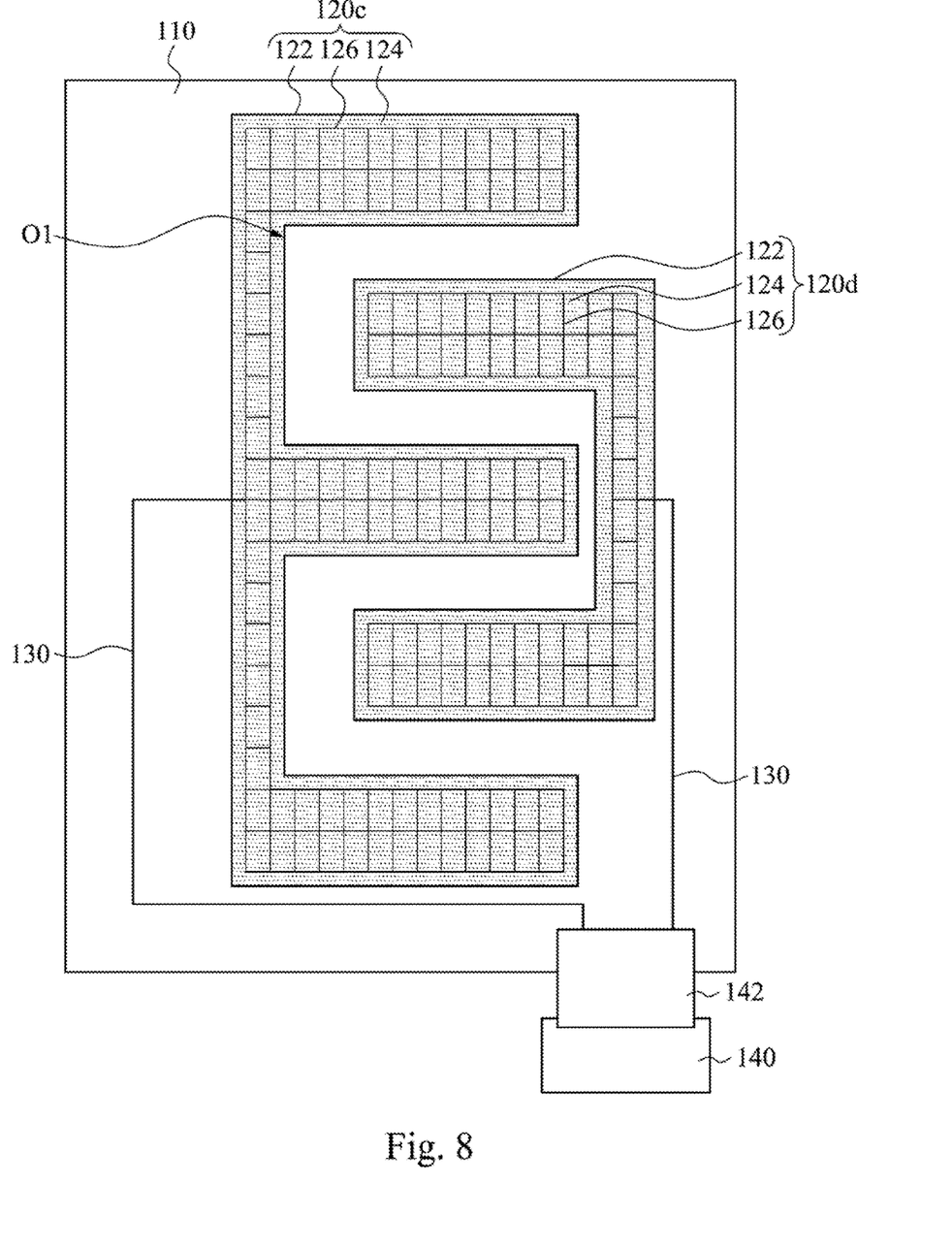
FIG. 8 is a top schematic view of a touch panel according to some embodiments of the invention.

FIG. 8 is a top schematic view of a touch panel 100 according to some embodiments of the invention. The present embodiments are similar to the embodiments of FIG. 1A, and the difference between the present embodiments and the embodiments of FIG. 1A is that: in the present embodiments, the touch panel is configured with single-layer touch electrodes structure without having X axis electrode (e.g. touch electrodes 120b and the bridge structures 160 in FIG. 1A) and Y axis electrode (e.g., touch electrodes 120a and the connection structures 150 in FIG. 1A) being intersected with each other. The touch panel 100 includes a substrate 110, touch electrodes 120c and 120d, a trace structure 130, and a control unit 140. The touch electrode 120c is disposed corresponding to plural touch electrodes 120d. For example, portions of the touch electrodes 120d are respectively disposed in the openings O1 of the touch electrode 120c. Herein, the touch electrode 120c does not intersect with the touch electrodes 120d, and the touch electrode 120c is electrically isolated from the touch electrodes 120d.

As aforementioned, each of the touch electrode 120c and the touch electrodes 120d includes a first transparent conductive layer 122, a second transparent conductive layer 124, and a metal mesh layer 126. The metal mesh layer 126 is sandwiched between the first transparent conductive layer 122 and the second transparent conductive layer 124. In the present embodiments, the first transparent conductive layer 122 and the second transparent conductive layer 124 are solid structures, and the trace structure 130 is a single-layer metal trace. It is noted that the scope of the present invention is not limit thereto. In some embodiments, the first transparent conductive layer 122 or the second transparent conductive layer 124 may also be mesh, for example, as shown in the embodiments of FIG. 1B or FIG. 5 to FIG. 7. In some embodiments, the trace structure 130 may be configured with a multilayer structure. In other embodiments, the touch electrode 120 and the trace structure 130 may also be configured to have the structures shown in the above embodiments.

Other details of the present embodiments are substantially the same as that of the above embodiments, and thereto omitted herein.

Figure 9:
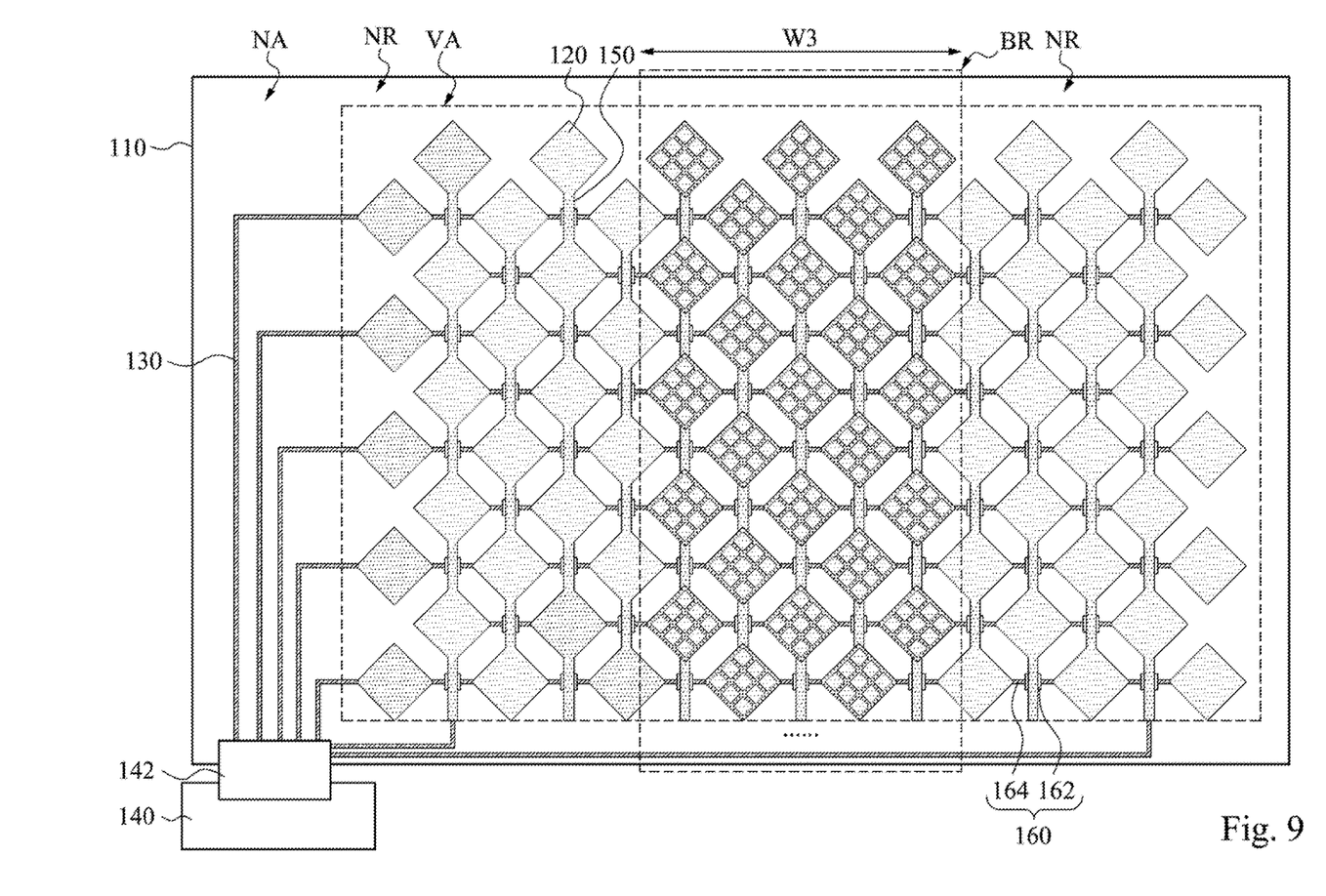
FIG. 9 is a top schematic view of a touch panel according to some embodiments of the invention.

FIG. 9 is a top schematic view of a touch panel 100 according to some embodiments of the invention. As illustrated previously, the touch panel 100 includes a touch sensing area VA and a peripheral area NA, in which the touch electrodes 120, the connection structures 150, and the bridge structures 160 are disposed in the touch sensing area VA of the touch panel, and the trace structures 130 extend from the peripheral area NA to the touch sensing area VA so as to electrically connect the touch electrodes 120. Herein, the substrate 110 includes a bendable region BR in the middle portion of the substrate and unbendable regions NR disposed on opposite sides of the bendable region BR, and the bendable region BR may be overlapped with the touch sensing area VA.

In the plural embodiments of the present invention, the bendable region BR is applicable to curve with degrees of R2 to R8. In some embodiments, the bendable region BR is applicable to curve with a radius of curvature in a range of 1 millimeter to 8 millimeters. For example, in preferred embodiments, the bendable region BR of the substrate 110 is applicable to curve with a least radius of curvature in a range of 1 millimeter to 4 millimeters. In some embodiments, the bendable region BR of the substrate 110 has a width W3 equal to or greater than the radius of curvature, and the width W3 may be less than the radius of curvature of the substrate 110 multiplied by $2\pi$ (i.e., a ratio of the circumference of a circle to its radius). For example, if the unbendable regions NR are to be folded together, for making the bendable region BR curve with 180 degrees, a width W3 of the bendable region BR is designed to be equal to or greater than the least radius of curvature of the substrate 110 multiplied by $\pi$ (i.e., a ratio of the circumference of a circle to its diameter). Furthermore, in some embodiments, a ratio of an area of a overlapping region of the bendable region BR and the touch sensing area VA to an area of the touch sensing area VA may be in a range of 0.01 to 0.1.

In plural embodiments of the present invention, the touch electrodes 120 and the connection structures 150 in the bendable region BR may be configured in a way different from that of the touch electrodes 120 and the connection structures 150 in the unbendable regions NR. To be specific, the touch electrodes 120 in the bendable region BR may be configured with the multilayer structure (i.e., the three-layer configuration), and the touch electrodes 120 in the unbendable regions NR may only be formed with transparent conductive materials. For example, the touch electrodes 120 in the unbendable regions NR may only include the aforementioned first transparent conductive layer 122 or/and the aforementioned second transparent conductive layer 124. In addition, herein, the connection structure 150 in the bendable region BR and the unbendable regions NR are configured with only the aforementioned first transparent connection line 152 or the aforementioned second transparent connection line 154, but it should not limit the scope of the present embodiments. In other embodiments, the connection structure 150 in the bendable region BR may be configured with the multilayer structure (i.e., the three-layer configuration), while the connection structure 150 in the unbendable region NR are configured with only the aforementioned first transparent connection line 152 or/and the aforementioned second transparent connection line 154. Herein, the configuration of the structures of the touch electrodes 120 and the connection structures 150 in the bendable region BR refers to those illustrated the above embodiments, and not repeated herein.

Herein, it is easy that the touch electrodes 120 and the connection structures 150 in the bendable region BR are folded and broken by external forces, and therefore the conductance thereof may decrease. In the present embodiments, the touch electrodes 120 and the connection structures 150 in the bendable region BR are configured with the multilayer structure, so that the touch electrodes 120 and the connection structures 150 in the bendable region BR have higher conductance and are prevented from being broken by folding without influencing the brightness.

In the present embodiments, the trace structures 130 and the bridge conductive lines 164 may be together formed on the substrate 110, while the trace structures 130 and the touch electrodes 120 are not fabricated together. Herein, the materials and thicknesses of the trace structures 130 and the bridge conductive lines 164 are the same. For example, the materials of the trace structures 130 and the bridge conductive lines 164 are metal. Also, the trace structures 130 may be at least partially disposed between the touch electrodes 120 and the substrate 110, so that the touch electrodes 120 may be electrically connected with the flexible printed circuit board 142 and the control unit 140 through the trace structures 130.

It is noted that, the configurations of the touch electrode 120, the trace structure 130, the connection structure 150, and the bridge structure 160 mentioned in the above various embodiments may be put together in any adequate arrangements, and not limited to those shown in figures.

In the embodiments of present invention, in order to increase the transmittance and conductance of the sensing electrode of the touch panel, the sensing electrode is formed with the transparent conductive material, the mesh metal conductive material, and the transparent conductive material. In some embodiments, the traces and connection lines may also be designed to have the three-layer structure. In some embodiments, the transparent conductive materials may also be designed to have a mesh structure, and the mesh pattern may be the same as the pattern of mesh metal conductive material, thereby saving the number of the masks used in fabrication processes.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch panel, comprising:
    a substrate having a touch sensing area and a peripheral circuit area;
    a touch electrode layer disposed on the touch sensing area of the substrate, wherein the touch electrode layer comprises:
    a plurality of touch electrodes, wherein each of the touch electrodes comprises:
        a first transparent conductive layer disposed on the substrate;
        a second transparent conductive layer disposed on the first transparent conductive layer, wherein the first and second transparent conductive layers are solid layers; and
        a metal mesh layer disposed between the first transparent conductive layer and the second transparent conductive layer, wherein the metal mesh layer is sandwiched between the first transparent conductive layer and the second transparent conductive layer, the metal mesh layer is at least partially in contact with the first transparent conductive layer and the second transparent conductive layer, the metal mesh layer comprises a plurality of metal lines, and the metal lines are connected with each other to form a mesh structure, the first transparent conductive layer has a first portion covered by the metal lines and a second portion uncovered by the metal lines, and the second transparent conductive layer covers the first portion and the second portion of the first transparent conductive layer; and
    at least one connection structure connecting adjacent two of the touch electrodes to each other;
    a control unit; and
    a trace structure disposed on the peripheral circuit area of the substrate and configured to electrically connect at least one of the touch electrodes to the control unit.

2. The touch panel of claim 1, wherein the trace structure comprises at least one metal trace, and the metal trace has the same thickness as that of the metal lines of the metal mesh layer.

3. The touch panel of claim 2, wherein the trace structure comprises at least one first transparent trace disposed between the metal trace and the substrate, wherein the first transparent trace has the same thickness as that of the first transparent conductive layer.

4. The touch panel of claim 3, wherein the trace structure comprises at least one second transparent trace, the metal trace is disposed between the second transparent trace and the substrate, and the second transparent trace has the same thickness as that of the second transparent conductive layer.

5. The touch panel of claim 2, wherein the trace structure comprises at least one second transparent trace, the metal trace is disposed between the second transparent trace and the substrate, and the second transparent trace has the same thickness as that of the second transparent conductive layer.

6. The touch panel of claim 2, wherein a width of the metal trace is greater than a width of the metal lines of the metal mesh layer.

7. The touch panel of claim 1, further comprising:
    at least one bridge structure connecting two of the touch electrodes respectively disposed at two sides of the connection structure.

8. The touch panel of claim 7, wherein the connection structure comprises a transparent connection line and a metal connection line, the transparent connection line is disposed between the metal connection line and the substrate, and the transparent connection line has a thickness the same as that of the first transparent conductive layer.

9. The touch panel of claim 8, wherein a width of the transparent connection line is substantially equal to a width of the metal connection line.

10. The touch panel of claim 7, wherein the connection structure comprises a metal connection line, and a width of the metal connection line is greater than a width of the metal lines of the metal mesh layer.

11. The touch panel of claim 7, wherein the trace structure comprises at least one metal trace, and the bridge structure comprises at least one bridge conductive line, and a thickness of the metal trace is the same with a thickness of the bridge conductive line.

* * * * *